United States Patent [19]

Drexler

[11] Patent Number: 4,998,744
[45] Date of Patent: Mar. 12, 1991

[54] CHILD'S SEAT

[76] Inventor: Joannes Drexler, Lijsterbeslaan 3, 6982 CL Doesburg, Netherlands

[21] Appl. No.: 367,077

[22] Filed: Jun. 16, 1989

[30] Foreign Application Priority Data

Jun. 17, 1988 [NL] Netherlands .......................... 8801549

[51] Int. Cl.⁵ ............................................. B62J 11/00
[52] U.S. Cl. ...................................... 280/202; 280/28
[58] Field of Search ...................... 280/202, 288.4, 801, 280/807; 224/32 A, 39; 403/385, 253, 254; 297/243, 195, 487, 437

[56] References Cited

U.S. PATENT DOCUMENTS

| 1,013,007 | 12/1911 | Fowler et al. | 280/202 |
| 3,133,277 | 5/1964 | Hood | 280/801 |
| 3,802,598 | 4/1974 | Burger et al. | 280/202 |
| 4,051,985 | 10/1977 | Berger | 280/202 X |
| 4,053,091 | 10/1977 | Martelet | 224/32 A |
| 4,662,683 | 5/1987 | Knoedler et al. | 297/487 |
| 4,666,071 | 5/1987 | Irwin et al. | 224/32 A |

FOREIGN PATENT DOCUMENTS

| 1213510 | 11/1986 | Canada . | |
| 0232800 | 8/1987 | European Pat. Off. . | |
| 3206935 | 10/1982 | Fed. Rep. of Germany . | |
| 0912651 | 8/1946 | France | 280/202 |
| 8501057 | 11/1986 | Netherlands | 280/202 |
| 0457219 | 11/1936 | United Kingdom | 280/202 |

Primary Examiner—Charles A. Marmor
Assistant Examiner—Victor E. Johnson
Attorney, Agent, or Firm—Griffin Branigan & Butler

[57] ABSTRACT

A child's seat comprising a bottom, armrests, a backrest and footrests, as well as means for mounting the seat on a bicycle. The bottom is provided with a forward extension adapted for attachment to a rear fork of the bicycle by means of a clamping member. The seat is characterized by a substantially U-shaped bracket rotatably attached to the bottom and containing the footrests. Said bracket has forked elements adapted to coact with clamping members attached releasably to the fork legs.

11 Claims, 5 Drawing Sheets

CHILD'S SEAT

This invention relates to a child's seat having a bottom, armrests, a backrest and footrests, as well as means for mounting the child's seat on a bicycle.

In a known child's seat, the means for mounting the seat on a bicycle consist of a bracket attached to the underside of the seat, said bracket being secured with a separate clamping member to the luggage carrier of the bicycle by means of a bolt-and-nut joint. This means that the mounting or demounting takes quite some time, as well as requires a spanner. The result is that once such a child's seat has been mounted, it is mostly not demounted again but remains affixed to the bicycle.

Another drawback is that the bicycle has to be provided with a solid luggage carrier.

It is an object of the present invention to remove these drawbacks.

To that effect the child's seat is characterized in that the bottom is fitted with a forward extension attachable to a rear fork of the bicycle by means of a clamping member.

A second attachment point, ensuring a complete fixation, consists of a substantially U-shaped bracket containing the footrests and secured rotatably to the bottom, and having forked elements adapted to coact with clamping members secured detachably to the fork legs.

In a further elaboration of the present invention, the clamping member may consist of a mounting bracket and a clamping bracket interconnected by a bolt-and-nut joint for attachment of the forward extension to the rear of the bicycle, said mounting bracket being adapted to coact with the complementary end of the forward extension by means of a hook joint, e.g. a bayonet joint, thus enabling a very simple mounting and demounting.

Furthermore, the clamping members attached to the fork legs may each consist of clamping portion to be secured detachably to a fork leg and having a counter plate, said clamping portion being fitted itself with a bolt whose opposite end is threaded and adapted to coact with the nut. In this manner, also the second point of attachment of the child's seat can be secured very easily.

The latter is improved by making the facing sides of the clamping portion and the nut rounded and making the nut a wing nut.

Besides, the footrests may be fitted adjustably on the legs of the U-shaped bracket, so that the footrests are located at the correct height for the child in question.

The footrests may have a foot strap or elastic band, so that the child is positioned firmly in the seat.

Furthermore, the child's seat may be provided with a safety belt whose attachment takes place by frictionally receiving one eye-shaped end of the safety belt in a tubular nesting space of an armrest or the backrest, with a pin extending through the eye-shaped end, and with the wall of the tubular nesting space having an elongate slot with a view to a convenient assembly, said pin may have a spaced apart auxiliary pin extending parallel thereto, which is connected fixedly to the pin by means of a bridge piece.

One embodiment of the child's seat according to the present invention will now be described, by way of example, with reference to the accompanying drawings, in which.

Figure 3:
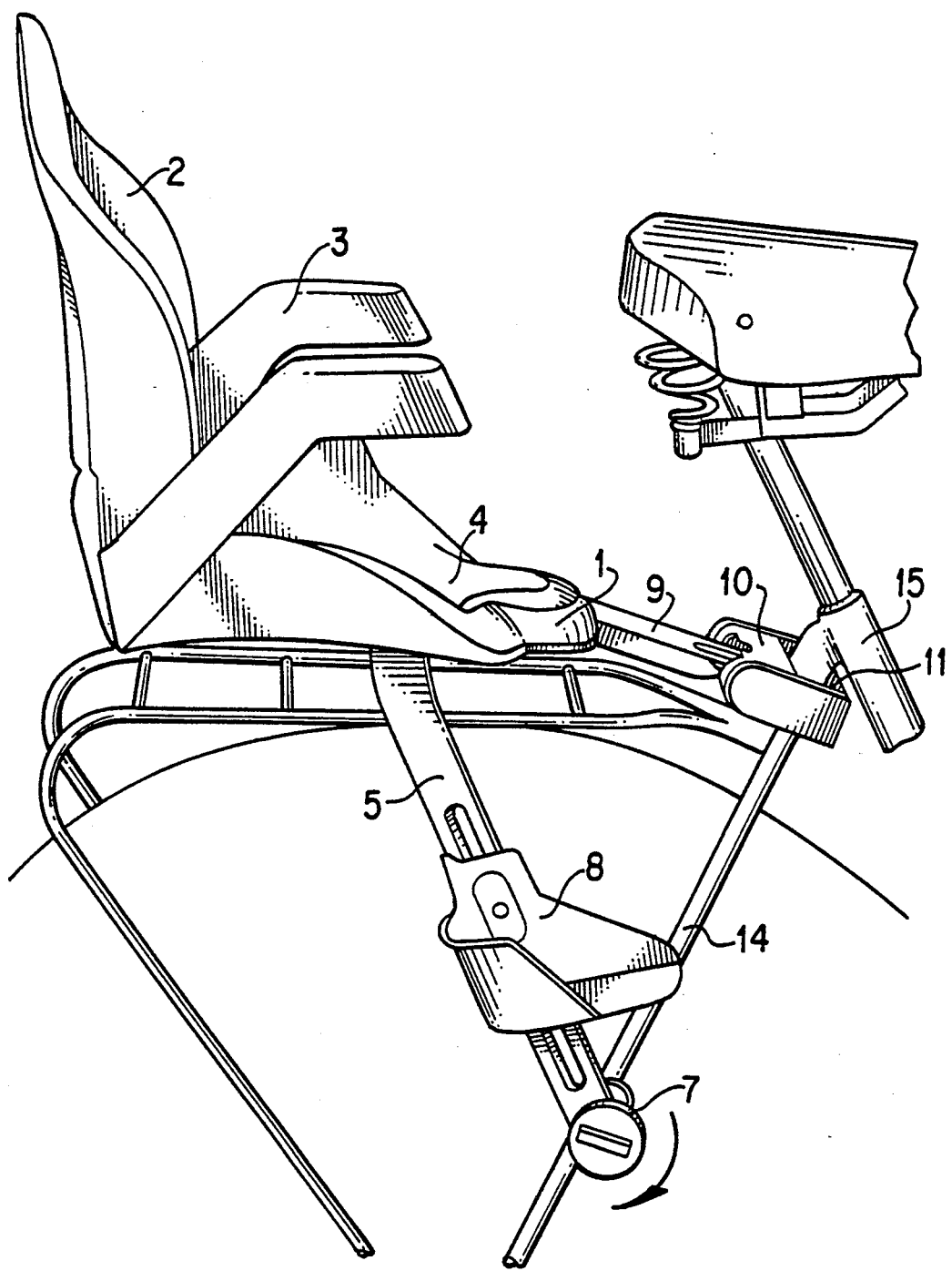
FIG. 3 is a view according to FIGS. 1 and 2 but essentially after assembly.

As shown in the drawings, a child's seat is provided with a bottom 1, a backrest 2 and armrests 3. A cushion 4 is placed releasably on the bottom by means of a Velcro fastener. Underneath the bottom there is rotatably fitted a U-shaped bracket 5, through means not shown, the ends 6 of which are fork-shaped. These fork-shaped ends 6 are adapted to coact with clamping members 7, (see FIG. 3) which will be described in more detail hereinafter with reference to FIG. 5.

As shown in the drawings, the bottom 1 is provided with a forward extension 9 whose free end is adapted to coact with a mounting bracket 10, which together with a clamping bracket 11, can be attached through a bolt 12 and a nut 13 (see FIG. 4) to a rear fork 14 of a bicycle 15, not further shown.

Figure 2:
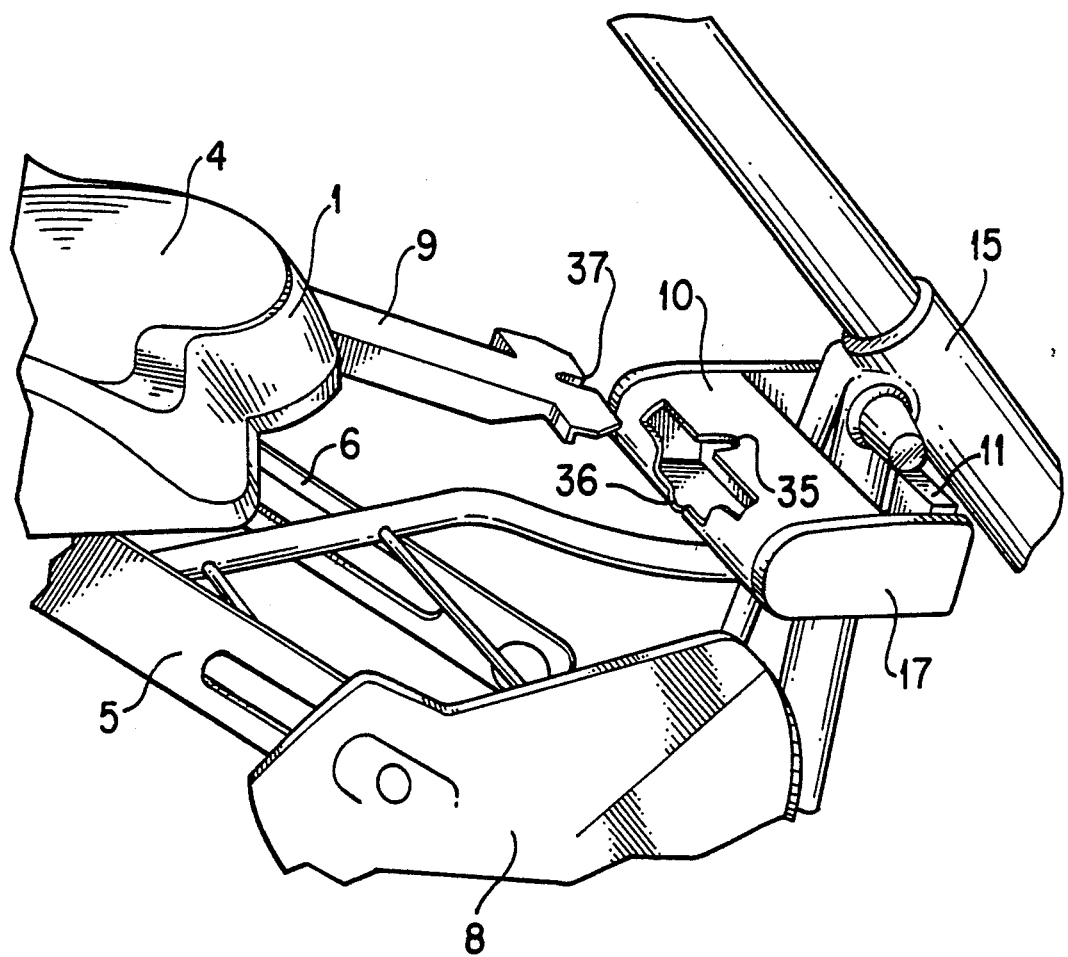
FIG. 2 is a view according to FIG. 1 during assembly.
Figure 4:
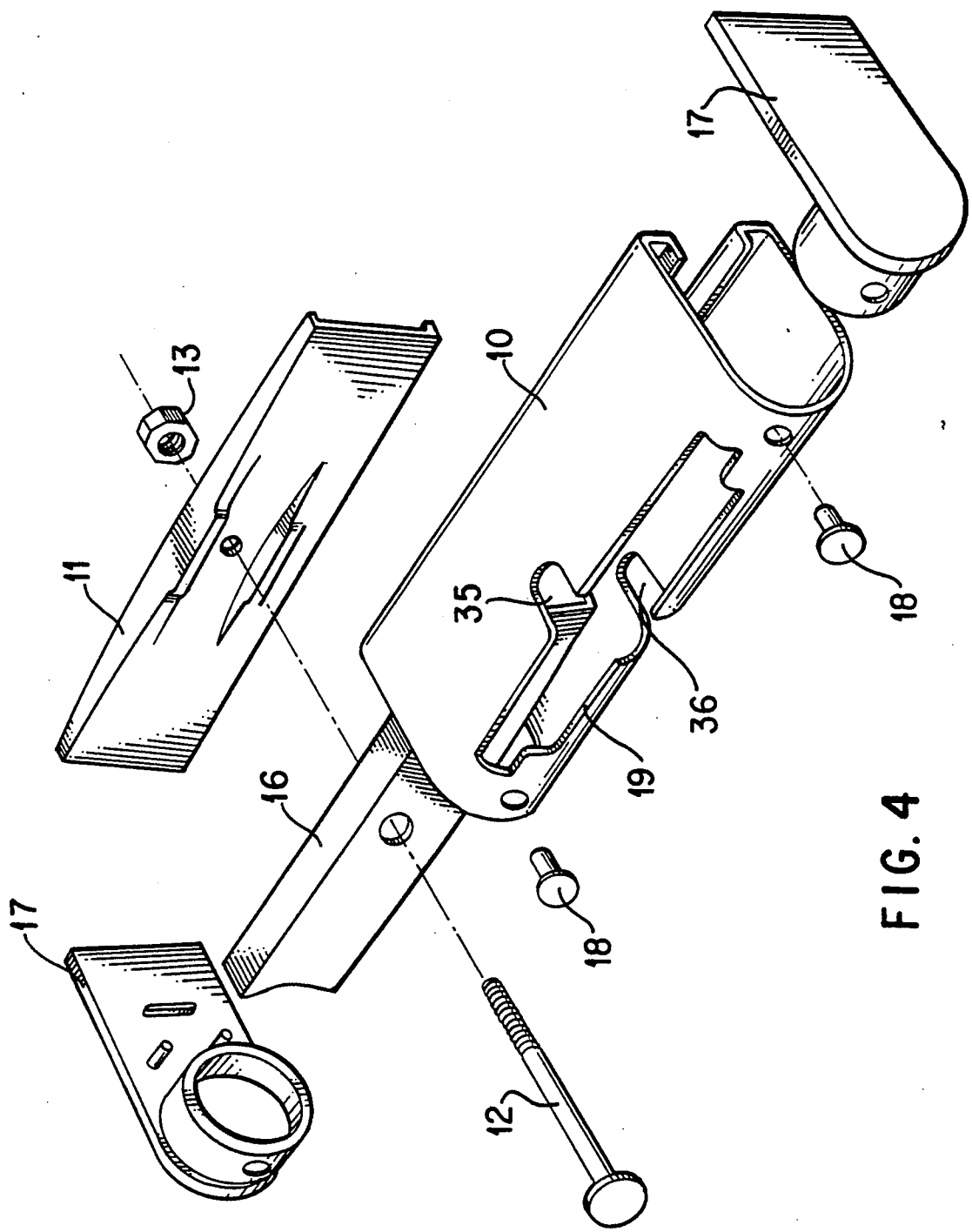
FIG. 4 is a perspective view of the mounting bracket and clamping bracket interconnected by a bolt-and-nut joint.

As shown in FIGS. 2 and 4, the insertion opening of the mounting bracket 10, serving for coaction with the forward extension 9, is fitted with recesses 35,36 superposed as viewed in vertical direction, while the forward extension 9 is fitted with a recess 37. The recesses are destined more in particular for the passage of a central brake cable, electrical cable or the like, which is thus properly retained and guarded, so that on the one hand the cable is protected against damage, while on the other hand a child sitting in the seat can hardly come into contact with the cable.

In the embodiment of the clamping member shown in FIG. 4, a connecting bracket 16 is received between mounting bracket 10 and clamping bracket 11. As further shown in FIG. 4, the open sides of mounting bracket 10 are closed by a closing plate 17 constructed in such a manner that connecting bracket 16, mounting bracket 10 and closing plates 17 form an integral unit. The attachment of the closing plates to the mounting bracket 10 takes place by means of rivets 18.

As already observed, the free end of the forward extension 9 is constructed so as to coact in the manner of a hook joint or a bayonet catch with a corresponding opening 19 provided in the mounting bracket 10, shown most clearly in FIG. 4.

Figure 1:
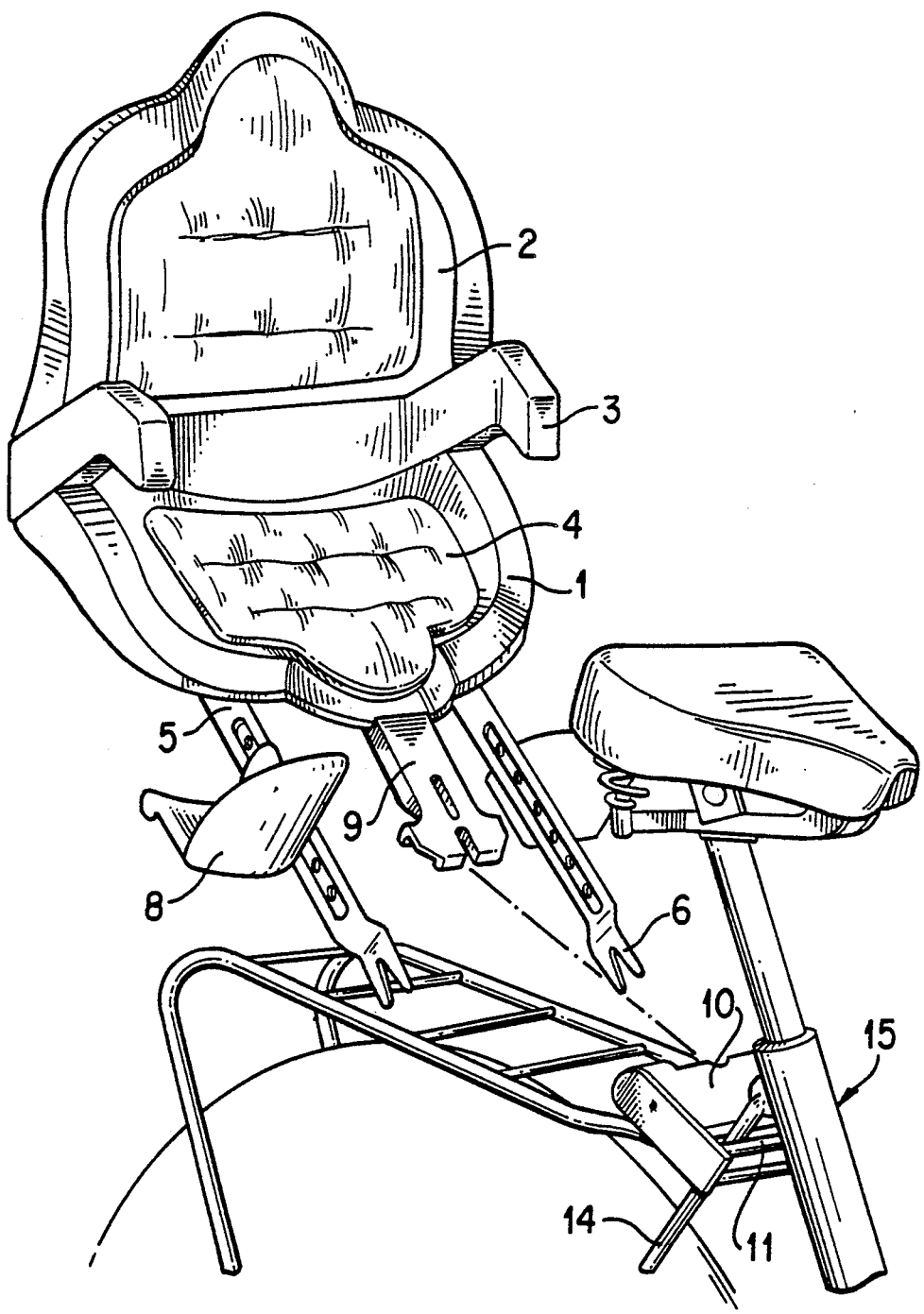
FIG. 1 is a side view of a child's seat and of a part of a bicycle before assembly of the seat.
Figure 5:
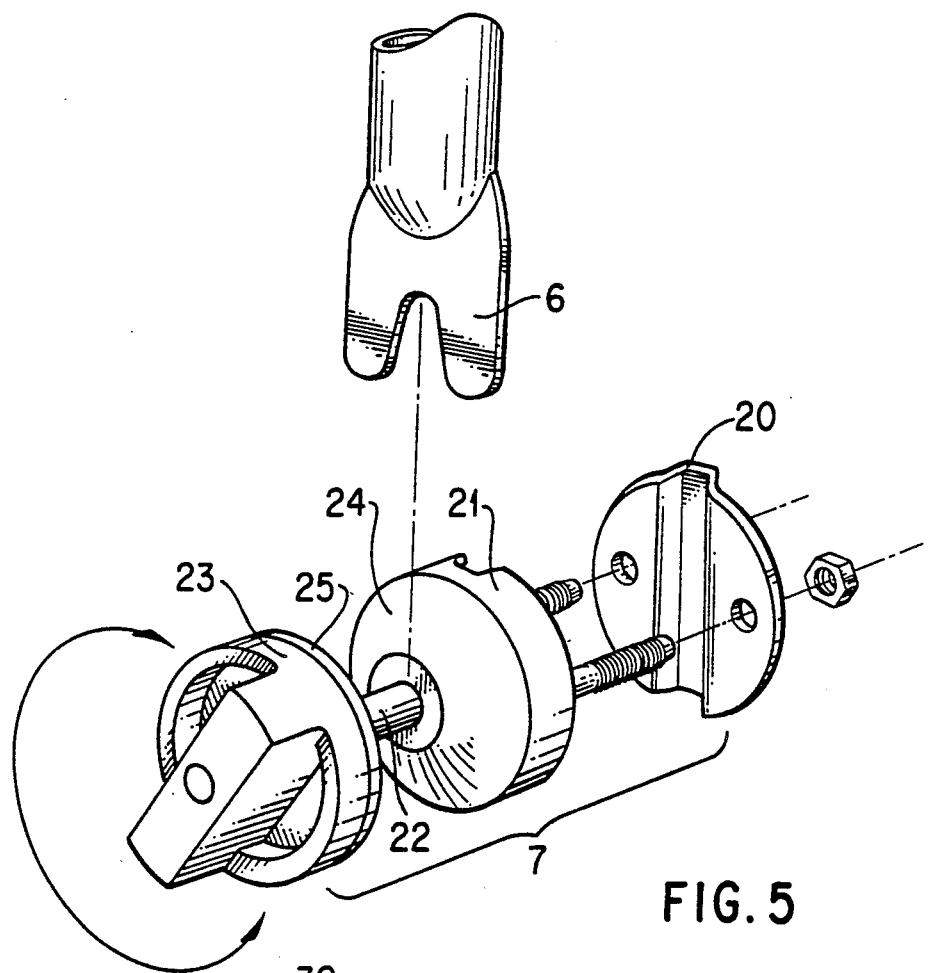
FIG. 5 shows a clamping member to be attached to the fork legs.

As shown in FIG. 5, the clamping members 7 attached to the rear fork legs 14 (see FIGS. 1 and 3) comprise a clamping portion 21 to be attached to a rear fork leg 14 by means of a counter plate 20. Affixed to the clamping portion 21 is a bolt 22 having a threaded free end. This thread is adapted for coaction with a wing nut 23. As further shown in FIG. 5, the facing sides of the clamping portion and the wing nut 24,25 are rounded, so that the forked ends 6 of the U-shaped bracket 5 can be easily brought in the proper position therebetween, after which the fork legs ends 6 can be secured by tightening the wing nut.

As may appear from the foregoing, during assembly first the forward extension 9 is therefore connected to clamping member 10,11 and subsequently the forked ends 6 of the U-shaped bracket 5 are connected to clamping members 7.

Figure 6:
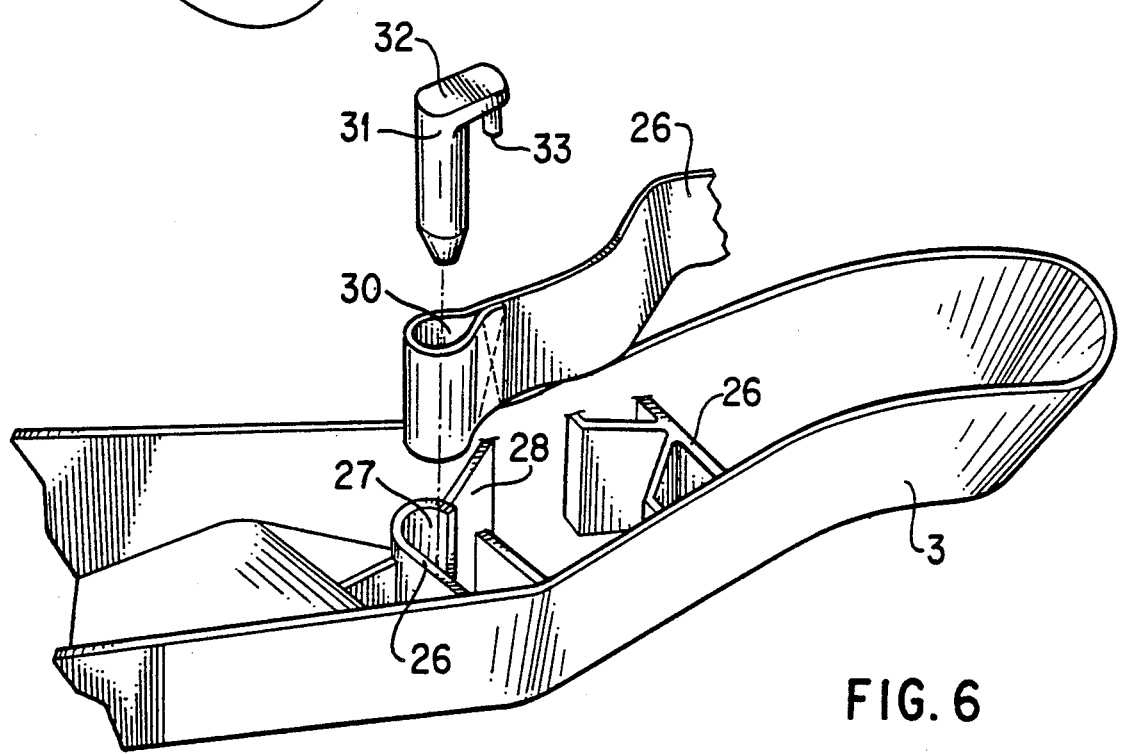
FIG. 6 is a perspective bottom view of a part of an armrest, showing with exploded parts the attachment of a safety belt.

As further shown in FIG. 6, the synthetic plastics armrest 3 is provided on the inside with reinforcing ribs 26. The rearmost of the two indicated reinforcing ribs 26 is fitted with a tubular nesting space 27, while the wall of said tubular nesting space contains an elongate slot 28. A safety belt 29 is fitted with an eye-shaped end 30 adapted to coact with a pin 31. Pin 31 is connected to an auxiliary pin 33 through a bridge piece 32. Said auxiliary pin 33 serves for facilitating the assembly, during which pin 31 is pushed into the looped end 30 and jointly therewith, with friction, into the tubular nesting space 27. Because armrest 3 is geniculated (the geniculated portion is indicated at 34), a very simple, yet good attachment of the safety belt is achieved. However, also various modifications are possible, for example fitting a pin in the armrest in fixed relationship, said pin being arranged for coaction with the eye-shaped end of the belt. In this case, the pin could be roughened, thus preventing it from falling out after assembly. Naturally, also other means can be employed.

It will be clear that a great many modifications are possible without departing from the scope of the inventive idea. Essential for the present invention is that the seat can be mounted and demounted very easily by means of clamping members affixed to the bicycle once, which basically have no protruding parts.

A further important advantage of the child's seat is that it is supported on, and attached to, parts of the bicycle frame and is independent of a strong luggage carrier present or absent.

I claim:

1. In a child's seat for mounting above the rear wheel of a bicycle having a frame which includes a rear fork, wherein the seat has a seat bottom, armrests, a backrest and mounting means for attaching the seat to the bicycle frame, the improvement comprising (1) an attachment means connected to said seat bottom and having a forward extension which extends forwardly therefrom and terminates with an attachment end, a first clamping means attached to the rear fork of the bicycle at a vertical position above said rear wheel, said attachment end and said first clamping means having complementary configurations such that upon insertion of the attachment end into said first clamping means the attachment end may be pivoted about a transverse axis of said clamping means from an insertion position to a secured position, and (2) a substantially U-shaped bracket with the U-end thereof rotatably attached to the seat bottom and the two legs thereof spinning said rear wheel and extending from said seat bottom to near the rear fork at a vertical position thereof below the top of the rear wheel with each of said two legs terminating in fork elements, and wherein a second clamping means is attached to a fork leg of the rear fork and being configured such as to receive said fork elements and lock and unlock said fork elements in said second clamping means with only digital manipulation thereof, whereby said seat may be mounted or removed from the bicycle without the use of tools.

2. A child's seat as claimed in claim 1, wherein footrests for the child are mounted on the said two legs of the U-shaped bracket.

3. A child's seat as claimed in claim 1, wherein the first clamping means comprises a mounting bracket and a clamping bracket interconnected by a bolt-and-nut joint, said mounting bracket having an elongated hook joint configuration and being adapted to coact with a complementary elongated hook shape of the said attachment end of the said forward extension.

4. A child's seat as claimed in claim 3, wherein the second clamping means comprises a releasable clamping portion and a counter plate, said clamping portion being fitted with a bolt having a threaded end, which threaded end is adapted to coact with a locking nut.

5. A child's seat as claimed in claim 4, wherein the clamping portion has facing sides and the facing sides of the clamping portion and the nut are rounded.

6. A child's seat as claimed in claim 4, wherein the nut is a wing nut.

7. A child's seat as claimed in claim 5, wherein the footrests are mounted adjustably on the legs of the U-shaped bracket.

8. A child's seat as claimed in claim 7, wherein the footrests are fitted with one of a foot strap or elastic band.

9. A child's seat as claimed in claim 1, and further comprising a safety belt, with which the belt ends are attached to the armrests by receiving an eye-shaped end of the belt with friction in a tubular nesting space of the armrests, and a pin extends through said eye-shaped end, with the wall of the tubular nesting space having an elongated slot.

10. A child's seat as claimed in claim 9, wherein an auxiliary pin is adapted to coact with the exterior of said tubular nesting space.

11. A child's seat as claimed in claim 10, wherein the end of the forward extension and the first clamping means are provided with openings which are aligned in the mounted condition of the seat for the passage of a cable.

* * * * *